United States Patent
Baba et al.

(10) Patent No.: US 9,944,274 B2
(45) Date of Patent: Apr. 17, 2018

(54) HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Masayuki Baba, Toyota (JP); Ichiro Isobe, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/491,325

(22) Filed: Apr. 19, 2017

(65) Prior Publication Data

US 2017/0313301 A1   Nov. 2, 2017

(30) Foreign Application Priority Data

Apr. 30, 2016   (JP) .................................. 2016-092197

(51) Int. Cl.
| | |
|---|---|
| B60L 9/00 | (2006.01) |
| B60L 11/00 | (2006.01) |
| G05D 1/00 | (2006.01) |
| B60W 20/30 | (2016.01) |
| F16H 37/02 | (2006.01) |
| F16H 61/70 | (2006.01) |
| F16H 3/72 | (2006.01) |
| B60K 6/365 | (2007.10) |
| B60K 6/543 | (2007.10) |
| B60K 6/547 | (2007.10) |
| F16H 61/66 | (2006.01) |

(52) U.S. Cl.
CPC .............. B60W 20/30 (2013.01); B60K 6/365 (2013.01); B60K 6/543 (2013.01); B60K 6/547 (2013.01); F16H 3/728 (2013.01); F16H 37/022 (2013.01); F16H 61/66 (2013.01); F16H 61/702 (2013.01); B60Y 2200/92 (2013.01); F16H 2061/6602 (2013.01); Y10S 903/902 (2013.01)

(58) Field of Classification Search
CPC ......... B60W 20/30; B60K 6/365; F16H 3/728
USPC ............................................................ 701/22
See application file for complete search history.

(56) References Cited

U.S. PATENT DOCUMENTS

2014/0200777 A1* 7/2014 Dufford .............. B60W 10/105
                                                            701/54

FOREIGN PATENT DOCUMENTS

JP     2006-321392 A    11/2006

OTHER PUBLICATIONS

U.S. Appl. No. 15/483,268, filed Apr. 10, 2017 in the name of Minamikawa et al.

* cited by examiner

*Primary Examiner* — Isaac G Smith
(74) *Attorney, Agent, or Firm* — Oliff PLC

(57) ABSTRACT

On simultaneous shifts in which shift control of virtual gear positions overlaps shift control of mechanical gear positions, an electronic control unit is configured to delay output of a shift command on the virtual gear position such that shifts of the virtual gear position and the mechanical gear position are performed in synchronization. Therefore, the virtual gear position and the mechanical gear position are shifted in synchronization, irrespective of a difference between the shift response times, and the feeling of strangeness given to the driver due to shift shock, or the like, is suppressed.

3 Claims, 11 Drawing Sheets

| MECHANICAL | CLUTCH | | BRAKE | |
| --- | --- | --- | --- | --- |
| GEAR POSITION | C1 | C2 | B1 | B2 |
| 1ST SPEED | O | | | (O) |
| 2ND SPEED | O | | O | |
| 3RD SPEED | O | O | | |
| 4TH SPEED | | O | O | |

| VIRTUAL GEAR POSITION | 1 | 2 | 3 | 4 | 5 | 6 | 7 | 8 | 9 | 10 |
|---|---|---|---|---|---|---|---|---|---|---|
| MECHANICAL GEAR POSITION | 1 | 1 | 1 | 2 | 2 | 2 | 3 | 3 | 3 | 4 |

HYBRID VEHICLE AND CONTROL METHOD FOR HYBRID VEHICLE

INCORPORATION BY REFERENCE

The disclosure of Japanese Patent Application No. 2016-092197 filed on Apr. 30, 2016 including the specification, drawings and abstract is incorporated herein by reference in its entirety.

BACKGROUND

1. Technical Field

The disclosure relates to a hybrid vehicle, and a control method for the hybrid vehicle.

2. Description of Related Art

A vehicle is known which has an electric continuously variable speed change unit that can steplessly change the rotational speed of a drive source through torque control of a differential rotating machine, and transmit resulting rotation to an intermediate transmission member, and a mechanical stepwise variable speed change unit that is disposed between the intermediate transmission member and drive wheels, and can mechanically establish a plurality of gear positions (mechanical gear positions) having different speed ratios of the rotational speed of the intermediate transmission member to the output rotational speed. A hybrid vehicle described in Japanese Patent Application Publication No. 2006-321392 (JP 2006-321392 A) is one example of this type of vehicle. According to a technology described in JP 2006-32192 A, in order to curb occurrence of shift shock due to change of the rotational speed in the inertia phase, during shifting of the mechanical stepwise variable speed change unit, the speed ratio of the electric continuously variable speed change unit is changed while the rotational speed of the drive source is kept substantially constant, so as to start the inertia phase of the mechanical stepwise variable speed change unit.

SUMMARY

However, it is difficult to completely prevent shift shock even in the shift control system as described above, and even a slight shock may cause the driver to feel strange or uncomfortable since the rotational speed of the drive source is substantially constant.

This disclosure is to further reduce the feeling of strangeness given to the driver due to shift shock during shifting of a mechanical stepwise variable transmission, in a vehicle having an electric continuously variable transmission and the mechanical stepwise variable transmission.

A hybrid vehicle according to a first aspect of the disclosure includes a drive source, an electric continuously variable transmission, a mechanical stepwise variable transmission, and an electronic control unit. The electric continuously variable transmission is configured to steplessly change a rotational speed of the drive source by torque control of a differential rotating machine, and transmit a changed rotational speed of the drive source to an intermediate transmission member. The mechanical stepwise variable transmission is disposed between the intermediate transmission member and drive wheels. The mechanical stepwise variable transmission is configured to establish a plurality of mechanical gear positions, the plurality of the mechanical gear positions are gear positions that have different speed ratios of a rotational speed of the intermediate transmission member to an output rotational speed of the mechanical stepwise variable transmission. The mechanical gear positions are mechanically established by the mechanical stepwise variable transmission. The electronic control unit is configured to control the electric continuously variable transmission so as to establish a plurality of virtual gear positions, the plurality of the virtual gear positions are gear positions that have different speed ratios of the rotational speed of the drive source to the output rotational speed of the mechanical stepwise variable transmission. The electronic control unit is configured to delay output of a shift command on the virtual gear position, with respect to output of a shift command on the mechanical gear position, such that a shift of the virtual gear position and a shift of the mechanical gear position are performed in synchronization, irrespective of a difference in a shift response time, on simultaneous shifts in which shift control of the virtual gear position overlaps shift control of the mechanical gear position.

A control method for a hybrid vehicle according to a second aspect of the disclosure includes a drive source, an electric continuously variable transmission, a mechanical stepwise variable transmission, and an electronic control unit. The electric continuously variable transmission is configured to steplessly change a rotational speed of the drive source by torque control of a differential rotating machine, and transmit a changed rotational speed of the drive source to an intermediate transmission member. The mechanical stepwise variable transmission is disposed between the intermediate transmission member and drive wheels. The mechanical stepwise variable transmission is configured to establish a plurality of mechanical gear positions, the plurality of the mechanical gear positions are gear positions that have different speed ratios of a rotational speed of the intermediate transmission member to an output rotational speed of the mechanical stepwise variable transmission. The mechanical gear positions are mechanically established by the mechanical stepwise variable transmission. The control method includes: controlling, by the electronic control unit, the electric continuously variable transmission so as to establish a plurality of virtual gear positions; and delaying, by the electronic control unit, output of a shift command on the virtual gear position, with respect to output of a shift command on the mechanical gear position, such that a shift of the virtual gear position and a shift of the mechanical gear position are performed in synchronization, irrespective of a difference in a shift response time, on simultaneous shifts in which shift control of the virtual gear position overlaps shift control of the mechanical gear position. The plurality of the mechanical gear positions are gear positions that have different speed ratios of the rotational speed of the drive source to the output rotational speed of the mechanical stepwise variable transmission.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
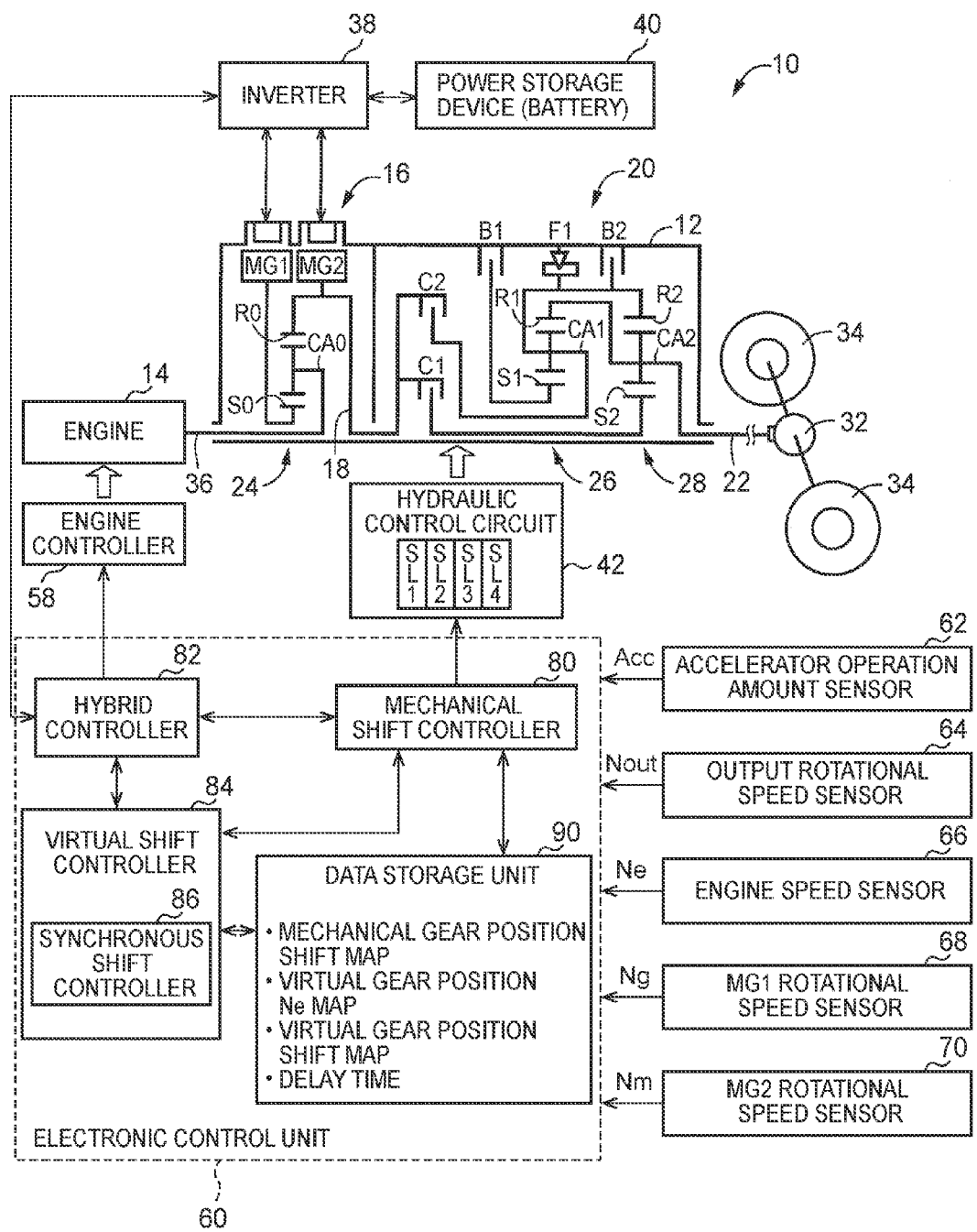
FIG. 1 is a view that includes a skeleton diagram of a vehicular drive system to which this disclosure is applied, and also shows a principal part of a control system associated with shift control.

Next, the configuration of this disclosure will be described. As a drive source of a hybrid vehicle, an engine, such as an internal combustion engine that generates power by burning fuel, an electric motor, or the like, is favorably used. While an electric continuously variable transmission has a differential mechanism, such as a planetary gear unit, it may use a paired-rotor electric motor having an inner rotor and an outer rotor. When the paired-rotor motor is used as the electric continuously variable transmission, the drive source is connected to one of the inner rotor and the outer rotor, and an intermediate transmission member is connected to the other rotor. Like a motor-generator, the paired-rotor motor can selectively deliver power running torque and regenerative torque, and also functions as a rotating machine for differential operation (which will be called "differential rotating machine"). The drive source and the intermediate transmission member are connected to the differential mechanism, etc., via a clutch or a speed change gear, as needed. A rotating machine for driving the vehicle for traveling (which will be called "driving rotating machine") is connected to the intermediate transmission member directly or via a speed change gear, or the like, as needed.

As the differential mechanism of the electric continuously variable transmission, a single planetary gear unit of a single pinion type or double pinion type is favorably used. The planetary gear unit includes three rotating elements, i.e., a sun gear, a carrier, and a ring gear. In a nomographic chart in which respective rotational speeds of the three rotating elements can be connected by a single straight line, the drive source is connected to a rotating element (the carrier of the single pinion type planetary gear unit, or the ring gear of the double pinion type planetary gear unit) located at the middle in the chart and having a middle rotational speed, and the differential rotating machine and the intermediate transmission member are connected to the rotating elements at the opposite ends in the chart, for example. The intermediate transmission member may be connected to the middle rotating element, and the differential rotating machine and the drive source may be connected to the rotating elements at the opposite ends. While the three rotating elements may be differentially rotatable at all times, any two of the rotating elements may be integrally connected by a clutch, such that they can rotate as a unit according to operating conditions. Also, differential rotation of the three rotating elements may be restricted by stopping rotation of the rotating element to which the differential rotating machine is connected, by means of a brake. Further, a differential mechanism as a combination of two or more planetary gear units may be employed as the electric continuously variable transmission.

The rotating machine, which means a rotating electric machine, is specifically an electric motor, a generator, or a motor-generator that can selectively use the functions of the motor and the generator. Motor-generators may be used as the differential rotating machine and the driving rotating machine. A generator may be employed as the differential rotating machine, and an electric motor may be employed as the driving rotating machine.

As a mechanical stepwise variable transmission, a transmission of a planetary gear type or parallel shaft type is widely used. In the transmission, two or more hydraulic friction devices are engaged and released, for example, so that a plurality of gear positions (mechanical gear positions) can be established. While the mechanical gear positions appropriately provide forward gear positions, they may provide backward gear positions.

The electric continuously variable transmission and the mechanical stepwise variable transmission are controlled by an electronic control unit, so that a plurality of virtual gear positions can be established. The virtual gear positions are established by controlling the rotational speed of the drive source according to the output rotational speed such that the speed ratio of each gear position can be maintained. The speed ratio of each of the virtual gear positions need not be a constant value like those of the mechanical gear positions of the mechanical stepwise variable transmission, but may be changed within a given range. Further, the speed ratio of each virtual gear position may be limited by the upper limit or lower limit of the rotational speed of each part, for example. It is desirable to shift or switch the virtual gear positions according to predetermined shift conditions of the virtual gear positions. For example, the shift conditions of the virtual gear positions may be defined by using a shift map of upshift lines and downshift lines determined in advance based on operating conditions of the vehicle, such as the output rotational speed and the accelerator operation amount, as parameters. In this connection, automatic shift conditions other than the shift map may also be set as the shift conditions of the virtual gear positions, or the virtual gear position may be shifted according to a shift request made by the driver, by means of a shift lever or an UP/DOWN switch, for example. While it is desirable that this disclosure is applied to both upshifts and downshifts, it may only be applied to either of upshifts and downshifts. Namely, virtual stepwise shifts using the virtual gear positions may be performed as one of the upshifts and the downshifts, and stepless speed changes like the conventional ones may be performed as the other.

It is desirable that the number of speeds of the virtual gear positions is equal to or larger than the number of speeds of the mechanical gear positions. For example, it is desirable that one or more virtual gear positions are assigned to each mechanical gear position, and the shift conditions of the mechanical gear positions are set such that the mechanical gear position is shifted in the same timing as the shift timing of the virtual gear position. In this manner, the mechanical stepwise variable transmission can be shifted, along with change of the rotational speed of the drive source; therefore, the driver will be less likely to feel strange or uncomfortable even in the presence of shift shock during shifting of the mechanical stepwise variable transmission. The number of speeds of the virtual gear positions is appropriately equal to or larger than twice the number of speeds of the mechanical gear positions. The mechanical gear position is shifted such that the rotational speed of the intermediate transmission member or the driving rotating machine connected to the intermediate transmission member is held within a given rotational speed range. Meanwhile, the virtual gear position is shifted such that the rotational speed of the drive source is held within a given rotational speed range. Accordingly, while the number of speeds of the mechanical gear positions and the number of speeds of the virtual gear positions are determined as appropriate, the number of speeds of the mechanical gear positions is appropriately within the range of about two speeds to six speeds, for example, while the number of speeds of the virtual gear positions is appropriately within the range of five speeds to twelve speeds, for example, in the case of a general vehicle.

Simultaneous shifts in which shift control of the virtual gear position overlaps shift control of the mechanical gear position may be performed not only in the case where shift determinations are made at the same time according to common shift conditions (such as a shift map), but also in the case where shift control of the mechanical gear position is already being executed when a shift determination on the virtual gear position is made. Synchronous shift control under which a shift of the virtual gear position and a shift of the mechanical gear position are performed in synchronization is control for delaying output of a shift command of the virtual gear position, so that at least a part of the inertia phase (a time period in which the rotational speed of an input-side member changes according to change of the speed ratio) during shifting of the virtual gear position overlaps that of the mechanical gear position. A point in time at which the delay of output of the shift command is terminated, namely, the time at which the shift command is generated, can be determined by determining whether an elapsed time from output of a shift command of the mechanical gear position has reached a delay time that is determined in advance by experiment, or simulation, according to a difference between the shift response time of the virtual gear position and that of the mechanical gear position. The time at which the shift command is generated may also be determined by detecting the start of the inertia phase, from change of the rotational speed of the intermediate transmission member during shifting of the mechanical gear position, or detecting the degree of progression of shift, from hydraulic pressure, or engagement torque, of a friction device(s) that carries out the shift.

One embodiment will be described in detail with reference to the drawings. FIG. 1 is a skeleton diagram of a vehicular drive system 10 to which this disclosure is applied, which also shows a principal part of a control system in connection with shift control. The vehicular drive system 10 includes an engine 14, an electric continuously variable transmission 16, a mechanical stepwise variable transmission 20, and an output shaft 22, which are arranged in series and disposed on a common axis within a transmission case 12 (which will be called "case 12") as a non-rotating member mounted on the vehicle body. The electric continuously variable transmission 16 is connected to the engine 14 directly or indirectly via a damper (not shown), or the like. The mechanical stepwise variable transmission 20 is connected to the output side of the electric continuously variable transmission 16. The output shaft 22 is connected to the output side of the mechanical stepwise variable transmission 20. In operation, the drive force of the engine 14 is transmitted from the output shaft 22 to a pair of drive wheels 34, via a differential gear unit (final reduction gear) 32, a pair of axles, etc. The vehicular drive system 10 is favorably used in a FR (front-engine, rear-drive) vehicle in which the system 10 is longitudinally mounted, for example. The engine 14 is a drive source for running the vehicle, and is an internal combustion engine, such as a gasoline engine or a diesel engine. In this embodiment, the engine 14 is connected to the electric continuously variable transmission 16 with no hydraulic transmission device, such as a torque converter or a fluid coupling, interposed therebetween.

The electric continuously variable transmission 16 includes a first motor-generator MG1 for differential operation, a differential mechanism 24, and a second motor-generator MG2 for running or driving the vehicle. The differential mechanism 24 is configured to mechanically distribute the output or power of the engine 14 to the first motor-generator MG1 and the intermediate transmission member 18. The second motor-generator MG2 is operatively connected to the intermediate transmission member 18 so as to rotate as a unit with the intermediate transmission member 18. Each of the first motor generator MG1 and the second motor genes MG2 can be selectively used as an electric motor or a generator. The first motor generator MG1 corresponds to the differential rotating machine, and the second motor-generator MG2 corresponds to the driving rotating machine. The vehicular drive system 10 of this embodiment is concerned with a hybrid vehicle including the engine 14 and the second motor-generator MG2 as drive sources for running the vehicle.

The differential mechanism 24 is in the form of a single pinion type planetary gear unit, and includes a sun gear S0, a carrier CA0, and a ring gear R0. The carrier CA0 is a first rotating element connected to the engine 14 via a connecting shaft 36. The sun gear S0 is a second rotating element connected to the first motor-generator MG1. The ring gear R0 is a third rotating element connected to the intermediate transmission member 18 and the second motor-generator MG2. In other words, in a nomographic chart of the electric continuously variable transmission 16 shown on the left side in FIG. 7, the engine (E/G) 14 is connected to the carrier CA0 that is located eat the middle in the chart and provides the middle rotational speed, and the first motor generator MG1 for differential operation, and the second motor-generator MG2 for running/driving the vehicle are respectively connected to the sun gear S0 and the ring gear R0 which are located at the opposite ends. The sun gear S0, carrier CA0, and the ring gear R0 can rotate relative to each other. The output of the engine 14 is divided and distributed to the first motor-generator MG1 and the intermediate transmission member 18, so that regeneration control (which is also called "power generation control") is performed on the first motor-generator MG1. The second motor-generator MG2 is rotated/driven with electric energy obtained through the regeneration control of the first motor-generator MG1, or a power storage device (battery) 40 is charged with the electric energy via an inverter 38. Thus, the differential status of the differential mechanism 24 can be changed as needed, by controlling the rotational speed (MG1 rotational speed) Ng of the first motor-generator MG1, through regeneration control or power running control of the first motor-generator MG1. Namely, the differential status of the differential mechanism 24 can be changed as needed, by controlling the rotational speed of the sun gear S0. Accordingly, the differential mechanism 24 can steplessly (continuously) change the speed ratio γ1 (=Ne/Nm) of the rotational speed of the connecting shaft 36 or the rotational speed (engine speed) Ne of the engine 14, to the rotational speed (intermediate transmission member rotational speed) Nm of the intermediate transmission member 18. Since the intermediate transmission member rotational speed Nm is equal to the rotational speed (MG2 rotational speed) of the second motor-generator MG2, these speeds will be denoted by the same symbol Nm.

The mechanical stepwise variable transmission 20 provides a part of a power transmission path between the engine 14 and the drive wheels 34, and is a planetary gear type, multiple-speed transmission having a single pinion type first planetary gear unit 26 and a single pinion type second planetary gear unit 28. The first planetary gear unit 26 includes a sun gear S1, a carrier CA1, and a ring gear R1. The second planetary gear unit 28 includes a sun gear S2, a carrier CA2, and a ring gear R2. The sun gear S1 is selectively connected to the case 12 via a first brake B1. The sun gear S2 is selectively connected to the intermediate transmission member 18 via a first clutch C1. The carrier CA1 and the ring gear R2 are connected integrally with each other, and are selectively connected to the intermediate transmission member 18 via a second clutch C2. The carrier CA1 and the ring gear R2 are selectively connected to the case 12 via a second brake B2. The carrier CA1 and the ring gear R2 are also connected to the case 12 as a non-rotating member via a one-way clutch F1, so as to be allowed to rotate in the same direction as the engine 14 but inhibited from rotating in the reverse direction. The ring gear R1 and the carrier CA2 are connected integrally with each other, and are connected integrally to the output shaft 22.

With the clutches C1, C2 and the brakes B1, B2 (which will be simply referred to as "clutches C" and "brakes B" when they are not particularly distinguished) selectively engaged, the mechanical stepwise variable transmission 20 is placed in a selected one of a plurality of forward gear positions having different speed ratios γ2 (=Nm/Nout) of the intermediate transmission member rotational speed Nm to the rotational speed (output rotational speed) Nout of the output shaft 22. The forward gear positions correspond to the mechanical gear positions that are mechanically established. As shown in an engagement operation table of FIG. 2, the mechanical 1st-speed gear position having the largest speed ratio γ2 is established when the first clutch C1 and the second brake B2 are engaged. Also, the mechanical 2nd-speed gear position having a smaller speed ratio γ2 than that of the mechanical 1st-speed gear position is established when the first clutch C1 and the first brake B1 are engaged. Further, the mechanical 3rd-speed gear position of which the speed ratio γ2 is equal to 1 is established when the first clutch C1 and the second clutch C2 are engaged. Then, the mechanical 4th-speed gear position of which the speed ratio γ2 is smaller than 1 is established when the second clutch C2 and the first brake B1 are engaged. Since the one-way clutch F1 is provided in parallel with the second brake B2, the second brake B2 may be engaged in the mechanical 1st-speed gear position when an engine brake is applied in a driven mode, and may be held in a released state in a driving mode, such as when the vehicle is started.

Figures 2, 3:
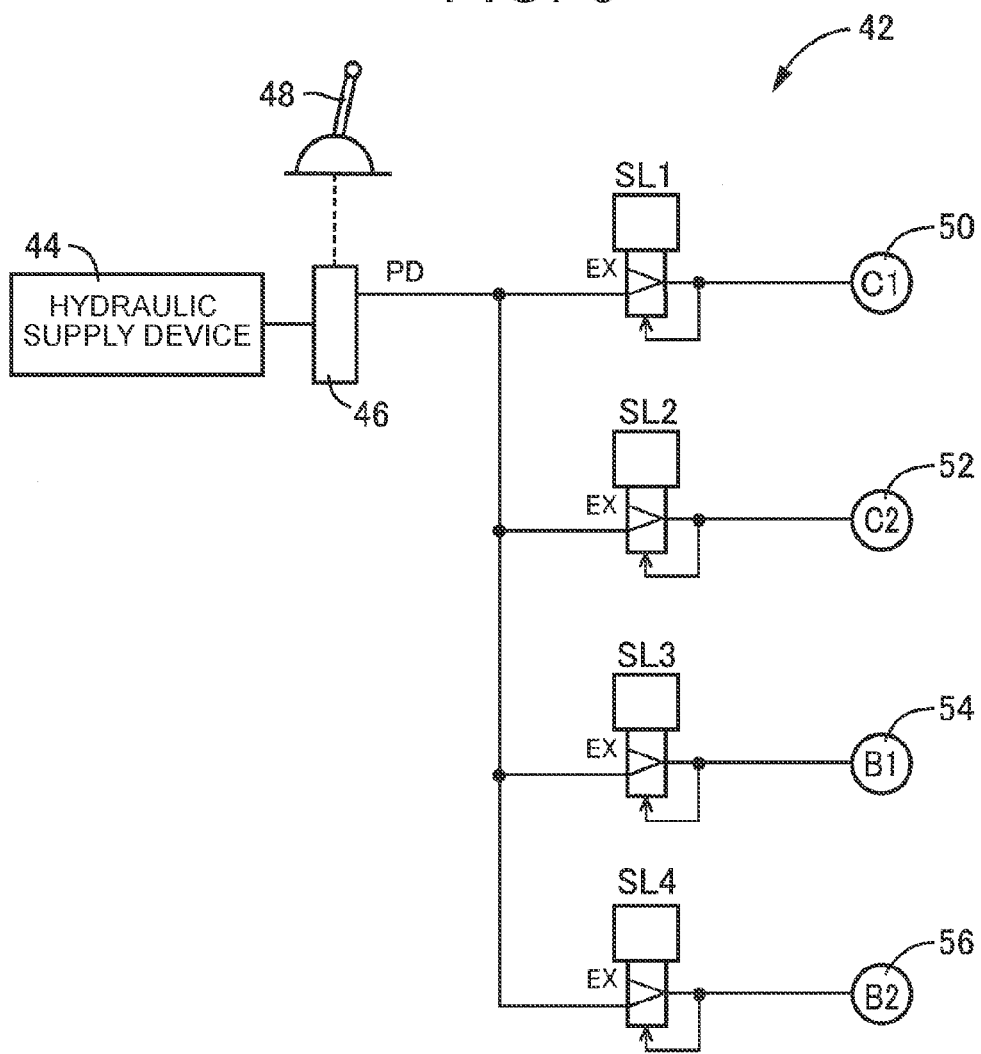
FIG. 2 is a view useful for explaining the relationship between a plurality of gear positions of a mechanical stepwise variable transmission of FIG. 1, and hydraulic friction devices that establish the mechanical gear positions.
FIG. 3 is a circuit diagram showing a hydraulic control circuit associated with clutches C1, C2 and brakes B1, B2 of the mechanical stepwise variable transmission of FIG. 1.

The clutches and the brakes B are multi-plate or single-plate type hydraulic friction devices that are frictionally engaged by hydraulic pressure. FIG. 3 is a circuit diagram showing a principal part of a hydraulic control circuit 42 including linear solenoid valves SL1-SL4 that control engagement and release of the clutches C and the brakes B. In the hydraulic control circuit 42, a D range pressure (forward range pressure) PD is supplied from a hydraulic supply device 44 via a manual valve 46. The hydraulic supply device 44 includes a mechanical oil pump, an electric oil pump, or the like, as a hydraulic pressure source, and delivers a given hydraulic pressure (line pressure) regulated by a line-pressure control valve, or the like. The mechanical oil pump is a pump rotated or driven by the engine 14. The electric oil pump is a pump driven by an electric motor when the engine is not in operation. The manual valve 46 is operable to mechanically or electrically switch oil passages according to operation of the shift lever 48. The manual valve 46 delivers the D range pressure PD when the shift lever 48 is operated to select a D range for forward traveling. The shift lever 48 is operable to select the D range for forward traveling, R range for reverse traveling, or N range for cutting off power transmission, for example.

Linear solenoid valves SL1-SL4 as hydraulic control devices are provided for respective hydraulic actuators (hydraulic cylinders) 50, 52, 54, 56 of the clutches C1, C2 and the brakes B1, B2. The linear solenoid valves SL1-SL4 are independently energized and de-energized by an electronic control unit 60. With the hydraulic pressures of the respective hydraulic actuators 50, 52, 54, 56 thus independently regulated and controlled, engagement and release of the clutches C1, C2 and the brakes B1, B2 are individually controlled, so that the mechanical 1st-speed gear position through the mechanical 4th-speed gear position are established. Also, in shift control of the mechanical stepwise variable transmission 20, clutch-to-clutch shift is performed. The clutch-to-clutch shift is shift control under which release and engagement of selected ones of the clutches C and brakes B associated with the shift are controlled at the same time, For example, on a 3→2 downshift from the mechanical 3rd-speed gear position to the mechanical 2nd-speed gear position, the second clutch C2 is released, and the first brake B1 is engaged at the same time, as indicated in the engagement operation table of FIG. 2. In order to suppress or reduce shift shock, the transient hydraulic pressure for releasing the second clutch C2 and the transient hydraulic pressure for engaging the second brake B2 are regulated or controlled according to predetermined change patterns, for example. Thus, the hydraulic pressures, or engagement torques, of the engagement devices (clutches C, brakes B) of the mechanical stepwise variable transmission 20 can be independently and continuously controlled by the linear solenoid valves SL1-SL4, respectively.

The vehicular drive system 10 includes the electronic control unit 60 as a controller that performs output control of the engine 14, and shift control of the electric continuously variable transmission 16 and the mechanical stepwise variable transmission 20. The electronic control unit 60 includes a microcomputer having CPU, ROM, RAM, input/output interface, and so forth. The electronic control unit 60 performs signal processing according to programs stored in advance in the ROM, while utilizing the temporary storage function of the RAM. The electronic control unit 60 may include two or more electronic control units for use in engine control, shift control, etc. as needed. The electronic control unit 60 receives various kinds of information needed for control, such as the amount of operation of the accelerator pedal (accelerator operation amount) Acc, output rotational speed Nout, engine speed Ne, MG1 rotational speed Ng, and the MG2 rotational speed Nm, from an accelerator operation amount sensor 62, output rotational speed sensor 64, engine speed sensor 66, MG1 rotational speed sensor 68, MG2 rotational speed sensor 70, and so forth. The output rotational speed Nout corresponds to the vehicle speed V.

Figure 4:
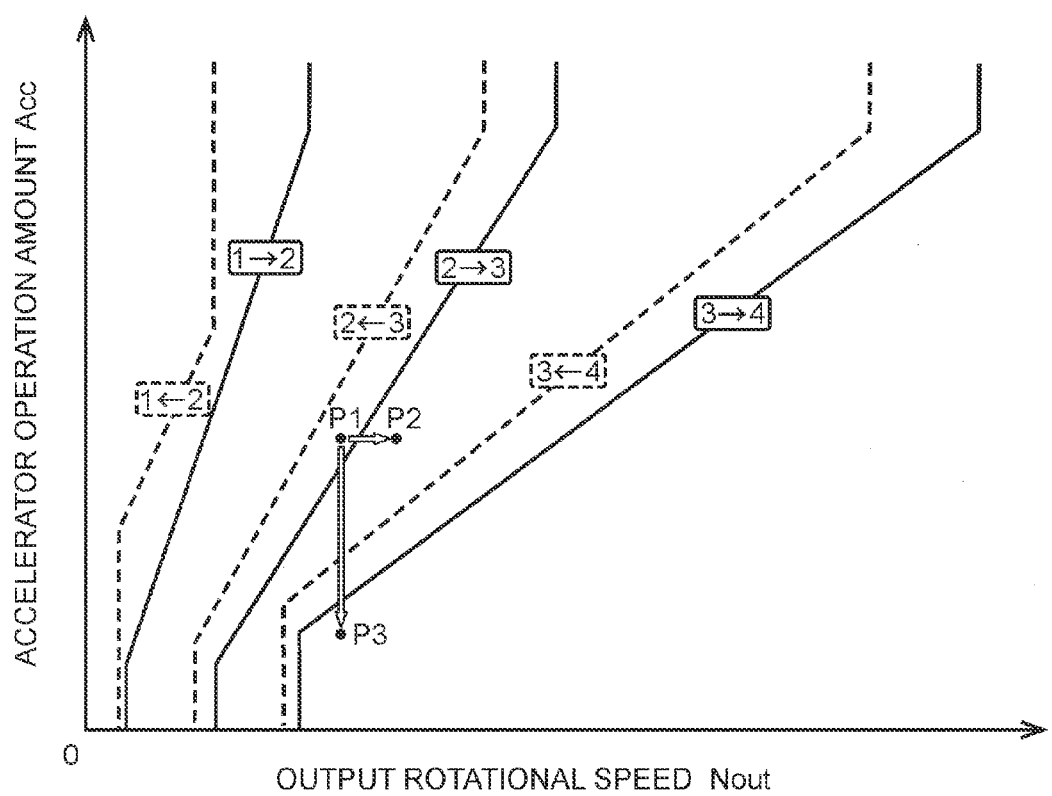
FIG. 4 is a view useful for explaining one example of a mechanical gear position shift map used when the mechanical gear positions of FIG. 2 are shifted or switched from one to another.

The electronic control unit 60 functionally includes a mechanical shift controller 80, a hybrid controller 82, and a virtual shift controller 84. The mechanical shift controller 80 makes a shift determination for the mechanical stepwise variable transmission 20, according a predetermined mechanical gear position shift map, using the output rotational speed Nout and the accelerator operation amount Acc as parameters, and changes engaged/released states of the clutches C and the brakes B as needed by means of the linear solenoid valves SL1-SL4, so as to automatically change the mechanical gear position of the mechanical stepwise variable transmission 20. FIG. 4 is one example of the mechanical gear position shift map, in which solid lines are upshift lines, and broken lines are downshift lines. The mechanical gear position shift map is determined such that the MG2 rotational speed Nm as the rotational speed of the intermediate transmission member 18 and the second motor-generator MG2 is held within a given rotational speed range. The mechanical gear position shift map corresponds to mechanical gear position shift conditions. The mechanical gear position shift map of MG. 4 is stored in advance in a data storage unit 90.

The hybrid controller 82 operates the engine 14 in an operating range having a high fuel efficiency, for example, and performs stepless shift control for steplessly changing the speed ratio γ1 of the electric continuously variable transmission 16. The stepless shift control is performed by controlling the proportion of driving force between the engine 14 and the second motor-generator MG2 and reaction force produced through power generation of the first motor-generator MG1, so as to steplessly change the speed ratio γ1 of the electric continuously variable transmission 16. For example, the hybrid controller 82 calculates a target (required) output of the vehicle from the accelerator operation amount Acc as the driver-requested output amount and the vehicle speed V, when the vehicle is travelling at the vehicle speed V, and calculates a necessary total target output from the target output of the vehicle and a charge required value. Then, the hybrid controller 82 obtains necessary input torque Tin of the mechanical stepwise variable transmission 20, according to the speed ratio γ2 of the mechanical gear position of the mechanical stepwise variable transmission 20, so that the total target output is obtained. Further, the hybrid controller 82 calculates a target engine output (required engine output) with which the necessary input torque Tin is obtained, in view of assist torque of the second motor-generator MG2, etc. Then, the hybrid controller 82 controls the engine 14 and controls the amount of power generation (regenerative torque) of the first motor-generator MG1 in a feedback manner, so as to achieve the engine speed Ne and engine torque Te with which the target engine output is obtained. The hybrid controller 82 performs the output control of the engine 14, via an engine controller 58 including an electronic throttle valve that controls the intake air amount, fuel injection device that controls the fuel injection amount, ignition device of which the ignition timing can be controlled to be advanced or retarded, and so forth. Also, the hybrid controller 82 performs power running control and regeneration control of the first motor-generator MG1 and the second motor-generator MG2, while performing charge/discharge control of the power storage device 40 via the inverter 38.

Figures 5, 6:
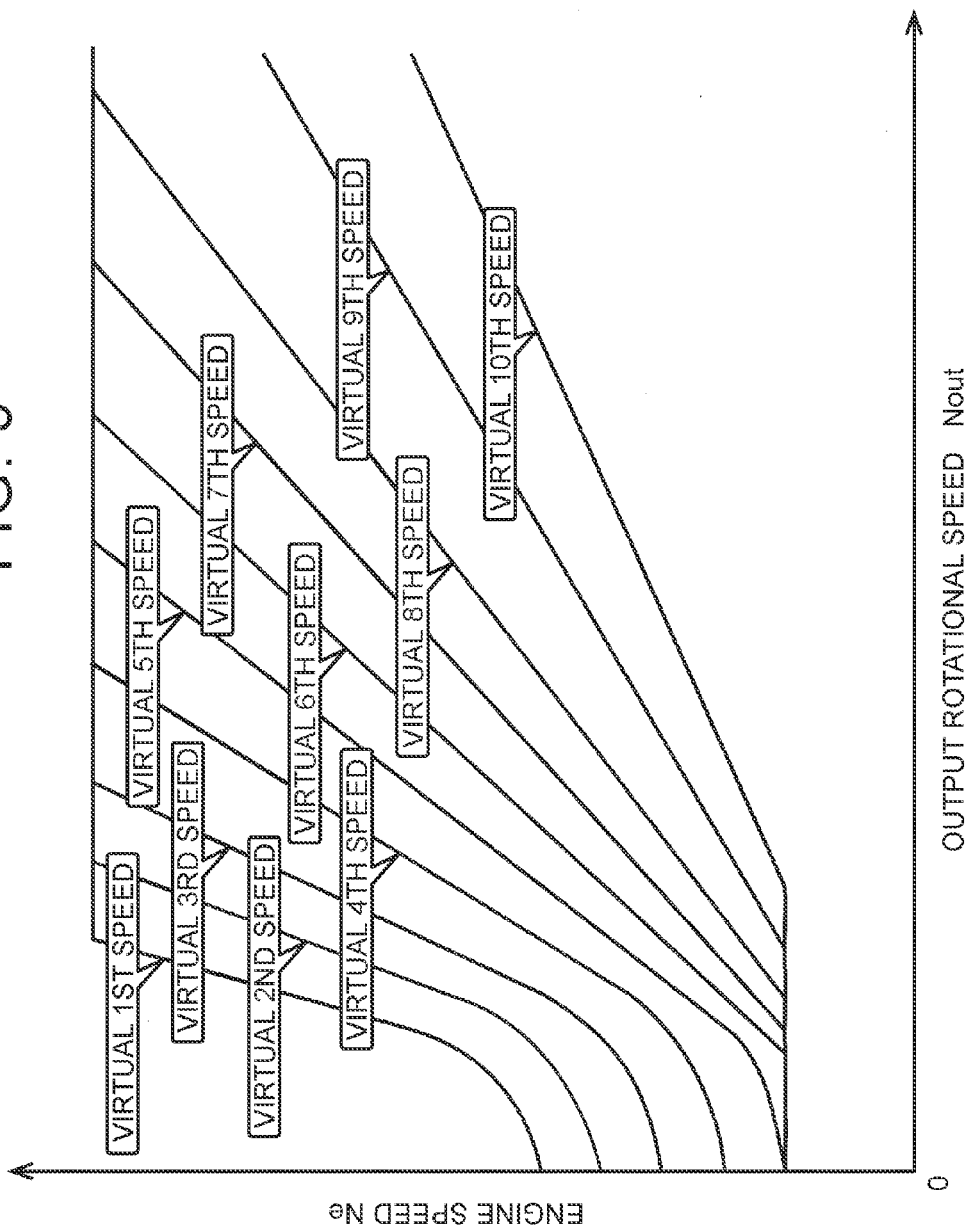
FIG. 5 is a view useful for explaining one example of a plurality of virtual gear positions established when an electric continuously variable transmission of FIG. 1 is shifted in a stepwise fashion.
FIG. 6 is a view useful for explaining one example of a gear position assignment table in which the virtual gear positions of FIG. 5 are assigned to the mechanical gear positions of FIG. 2.

The virtual shift controller 84 controls the electric continuously variable transmission 16 so as to establish a plurality of virtual gear positions having different speed ratios γ0 (=Ne/Nout) of the engine speed Ne to the output rotational speed Nout of the mechanical stepwise variable transmission 20. The virtual shift controller 84 performs shift control according to a predetermined virtual gear position shift map, so as to establish the virtual gear positions. The electronic control unit 60 that functionally includes the virtual shift controller 84 corresponds to a shift control device. The speed ratio γ0 is a value (γ0=γ1×γ2) obtained by multiplying the speed ratio γ1 of the electric continuously variable transmission 16 by the speed ratio γ2 of the mechanical stepwise variable transmission 20. As shown in FIG. 5 by way of example, the virtual gear positions can be established by changing the engine speed Ne through torque control of the first motor-generator MG1, according to the output rotational speed Nout, so that the speed ratio γ0 of each gear position can be maintained. The speed ratio γ0 of each virtual gear position need not be a constant value (a straight line that passes the origin 0 in FIG. 5), but may be changed in a given range, or may be limited by the upper limit and/or lower limit of the rotational speed of each part, for example. FIG. 5 shows the case where 10-speed shifts involving virtual 1st-speed gear position through virtual 10th-speed gear position as the plurality of virtual gear positions can be performed. As is apparent from FIG. 5, the speed ratio γ0, i.e., the slope (Ne/Nout) of the engine speed Ne with respect to the output rotational speed Nout, is reduced as the virtual gear position changes from the virtual 1st-speed gear position toward the virtual 10th-speed gear position. A selected one of the virtual gear positions can be established merely by controlling the engine speed Ne according to the output rotational speed Nout, irrespective of the type of the mechanical gear position of the mechanical stepwise variable transmission 20. Thus, the virtual gear positions having different speed ratios γ0 can be established by the electric continuously variable transmission 16. Since the engine speed Ne is changed in a stepwise fashion at the time of a shift of the virtual gear position, the shift feeling similar to that of the mechanical stepwise variable transmission can be obtained.

Like the mechanical gear position shift map, the virtual gear position shift map used for changing the virtual gear position is set in advance, using the output rotational speed Nout and the accelerator operation amount Acc as parameters. The virtual gear position shift map corresponds to virtual gear position shift conditions, and is set such that the engine speed Ne is held in a given rotational speed range.

Namely, similarly to the mechanical gear position shift map of FIG. 4, the virtual gear position is changed to a smaller-number, lower-speed gear position, as the accelerator operation amount Acc is larger, or the output rotational speed Nout is lower, and is changed to a larger-number, higher-speed gear position, as the accelerator operation amount Acc is smaller, or the output rotational speed Nout is higher. The virtual stepwise shifts may be performed in priority to stepless shift control executed by the hybrid controller 82, only when the driver selects a traveling mode, such as a sporty traveling mode, which emphasizes the traveling performance, for example. However, in this embodiment, the virtual stepwise shifts are basically performed except for the time when a certain restriction is placed on the implementation. The engine speed map of each virtual gear position of FIG. 5 and the virtual gear position shift map are stored in advance in the data storage unit 90.

Figure 7:
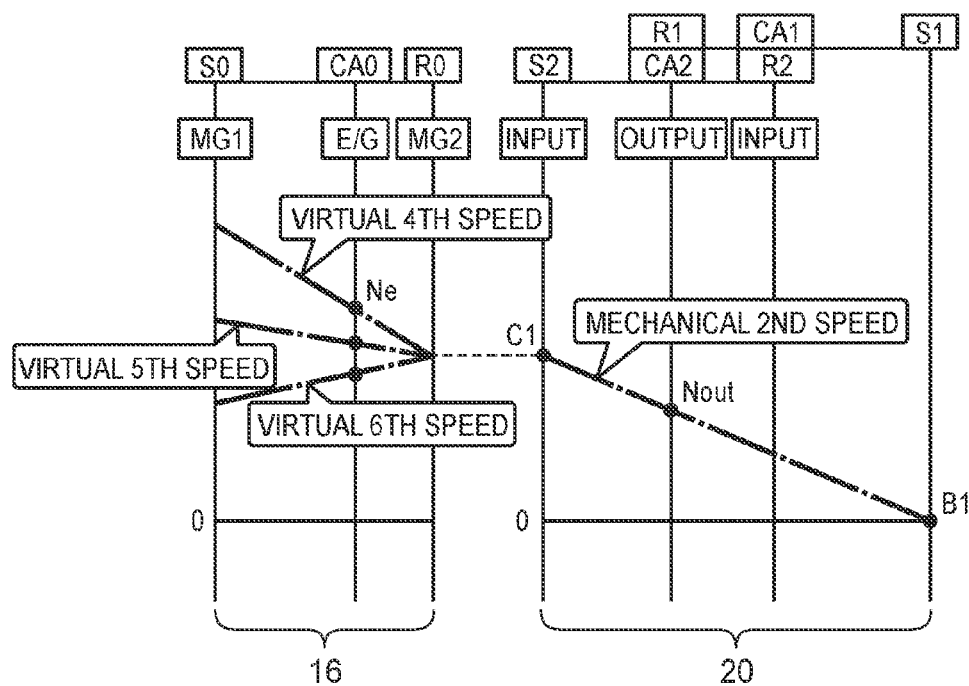
FIG. 7 is a view showing 4th speed to 6th speed of virtual gear positions established when the mechanical gear position is a 2nd-speed position in FIG. 6, on a nomographic chart.

Here, the virtual stepwise shift control performed by the virtual shift controller 84 and the mechanical stepwise shift control performed by the mechanical shift controller 80 are carried out in coordination. Namely, the number of speeds of the virtual gear positions is 10 speeds, which is larger by four speeds than the number of speeds of the mechanical gear positions, and one virtual gear position or two or more virtual gear positions is/are assigned to each mechanical gear position, so that the virtual gear position(s) is/are established while the mechanical gear position is established. FIG. 6 is one example of a gear position assignment table, in which the virtual gear positions are set such that the virtual 1st-speed gear position to the virtual 3rd-speed gear position are established with respect to the mechanical 1st-speed gear position, and the virtual 4th-speed gear position to the virtual 6th-speed gear position are established with respect to the mechanical 2nd-speed gear position. Further, the virtual gear positions are set such that the virtual 7th-speed gear position to the virtual 9th-speed gear position are established with respect to the mechanical 3rd-speed gear position, and the virtual 10th-speed gear position is established with respect to the mechanical 4th-speed gear position. FIG. 7 is one example of a nomographic chart in which rotational speeds of respective parts of the electric continuously variable transmission 16 and the mechanical stepwise variable transmission 20 can be connected by straight lines. FIG. 7 illustrates the case where the virtual 4th-speed gear position to the virtual 6th-speed gear position are established, when the mechanical gear position of the mechanical stepwise variable transmission 20 is the 2nd speed (mechanical 2nd speed). In the case of FIG. 7, each virtual gear position is established, by controlling the engine speed Ne so as to provide a given speed ratio γ0 with respect to the output rotational speed Nout.

With the plurality of virtual gear positions thus assigned to the plurality of mechanical gear positions in the above manner, a 3↔4 shift of the virtual gear position is performed when a 1↔2 shift of the mechanical gear position is performed, and a 6↔7 shift of the virtual gear position is performed when a 2↔3 shift of the mechanical gear position is performed, while a 9↔10 shift of the virtual gear position is performed when a 3↔4 shift of the mechanical gear position is performed. In this case, a common shift map is set as the virtual gear position shift map and the mechanical gear position shift map, such that the virtual gear position is shifted in the same timing as shift timing of the mechanical gear position. More specifically, upshift lines "3→4", "6→7", and "9→10" of the virtual gear position shift map are set so as to coincide with the upshift lines "1→2", "2→3", and "3→4", respectively, of the mechanical gear position shift map shown in FIG. 4, and downshift lines "3←4", "6←7", and "9←10" of the virtual gear position shift map are set so as to coincide with the downshift lines "1←2", "2←3", and "3←4", respectively, of the mechanical gear position shift map shown in FIG. 4. With regard to these shifts, a shift command on the mechanical gear position may be generated to the mechanical shift controller 80, based on a shift determination made on the virtual gear position according to the virtual gear position shift map, and the mechanical gear position shift map shown in FIG. 4 may be omitted. Thus, since the virtual gear position is shifted in the same timing as the shift timing of the mechanical gear position, the mechanical stepwise variable transmission 20 is shifted up or down, along with change of the engine speed Ne. Therefore, even if shift shock occurs during shifting of the mechanical stepwise variable transmission 20, the driver is less likely or unlikely to feel strange or uncomfortable. In this connection, since the mechanical stepwise variable transmission 20 is shifted up or down through control of engagement and release of selected ones of the hydraulic clutches C and brakes B, shift shock caused by torque variation, for example, is likely to occur.

The virtual shift controller 84 also includes a synchronous shift controller 86 in connection with simultaneous shift of the virtual gear position and the mechanical gear position. The synchronous shift controller 86 performs signal processing according to steps S1-S5, and R1-R7 of the flowcharts of FIG. 8 and FIG. 9, so that the virtual gear position and the mechanical gear position are shifted in synchronization, irrespective of a difference between the shift response time of the virtual gear position and that of the mechanical gear position.

Figure 8:
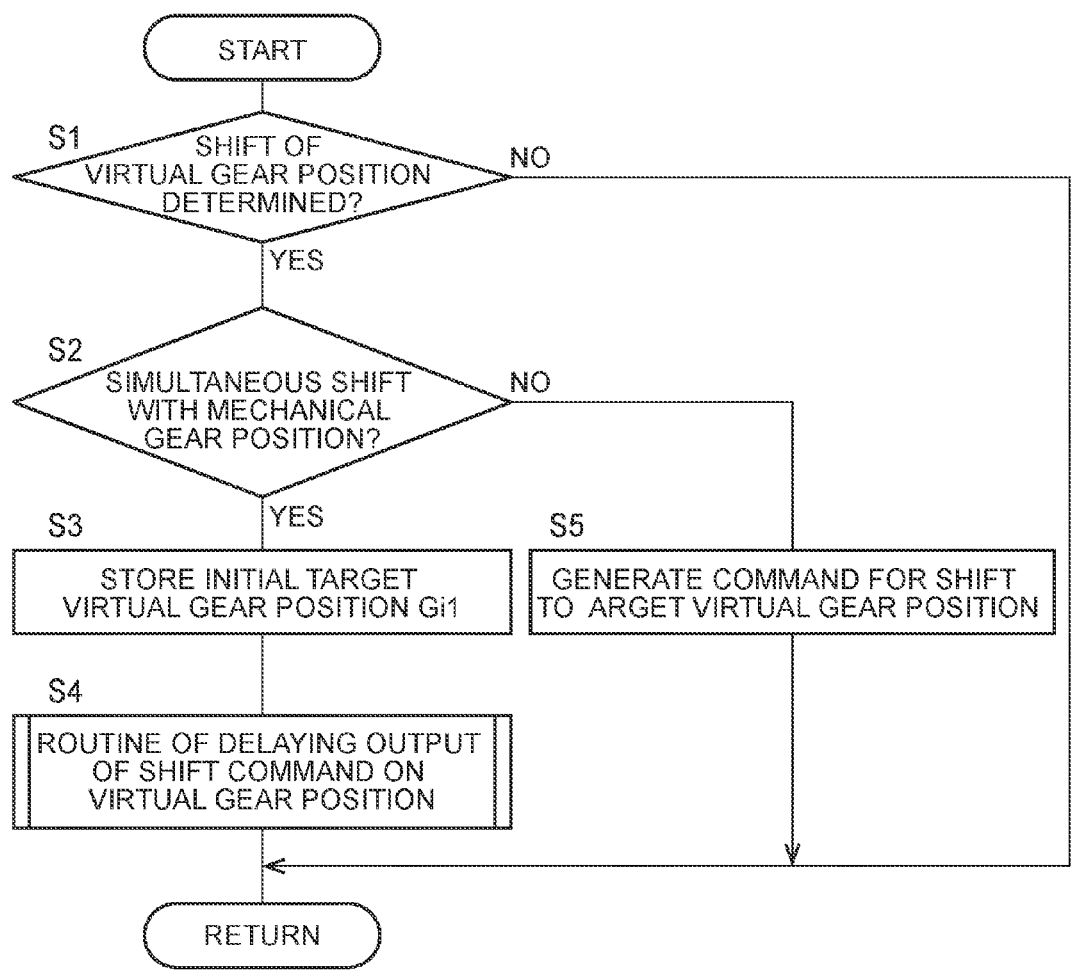
FIG. 8 is a flowchart useful for specifically explaining operation of a synchronous shift controller of FIG. 1.

In step S1 of FIG. 8, the electronic control unit 60 determines whether a shift determination that the electric continuously variable transmission 16 should be shifted to a certain virtual gear position has been made according to the virtual gear position shift map. If the shift determination has been made, step S2 and subsequent steps are executed. In step S2, the electronic control unit 60 determines whether the shift of the virtual gear position in question is performed at the same time as a shift of the mechanical gear position, namely, whether the type of the shift of the virtual gear position is any of the 3↔4 shift, 6↔7 shift, and 9↔10 shift. If the virtual gear position and the mechanical gear position are not simultaneously shifted, the electronic control unit 60 executes step S5, to immediately output a shift command to shift the electric continuously variable transmission 16 to the virtual gear position determined in step S1 as a target virtual gear position. Then, the engine speed Ne of the target virtual gear position is obtained by the electronic control unit 60, based on the output rotational speed Nout at the time of the shift of the virtual gear position, according to the engine speed map of FIG. 5 as described above. Then, the electronic control unit 60 performs torque control of the first motor-generator MG1, so as to achieve the engine speed Ne thus obtained, so that the target virtual gear position is immediately established.

If an affirmative decision (YES) is obtained in step S2, namely, if the type of the shift of the virtual gear position is any of the 3↔4 shift, 6↔7 shift, and 9↔10 shift, the mechanical gear position is shifted at the same time, and therefore, the electronic control unit 60 executes steps S3 and S4. In step S3, the electronic control unit 60 temporarily stores the target virtual gear position determined in step S1, as an initial target virtual gear position Gi1, and executes a delaying routine to delay output of a command for shift to the initial target virtual gear position Gi1 in step S4. The delaying routine of step S4 is carried out according to the flowchart of FIG. 9.

The mechanical shift controller 80 performs shift control on the mechanical stepwise variable transmission 20 when a shift determination on the mechanical gear position is made at the same time that the shift determination is made so as to shift the electric continuously variable transmission 16 to the initial target virtual gear position Gi1. In step R1 of FIG. 9, the electronic control unit 60 determines whether the shift of the mechanical stepwise variable transmission 20 has proceeded to the vicinity of the inertia phase. The determination on the inertia phase is made for the purpose of synchronization control performed so that at least a part of the inertia phase of the shift of the virtual gear position overlaps that of the mechanical gear position. Thus, it is not necessary to strictly detect the start of the inertia phase, but it may be determined whether the inertia phase is about to be started. In this embodiment, the electronic control unit 60 determines whether an elapsed time from the output of the shift command on the mechanical gear position has reached a predetermined delay time DEL. The delay time DEL may be a constant value, irrespective of the type of the shift. However, in this embodiment, the delay time DEL is set in advance by experiment or simulation, for example, based on the type of the shift of the mechanical gear position, namely, depending on whether the shift is an upshift or a downshift, or which speed of gear position from which the mechanical stepwise variable transmission 20 is shifted and which speed of gear position to which the mechanical stepwise variable transmission 20 is shifted. More specifically, the delay time DEL is determined, by subtracting the shift response time REi of the virtual gear position from the shift response time REm of the mechanical gear position which is determined according to the type of the shift of the mechanical gear position. Each of the shift response times REm and REi is a length of time it takes from output of a shift command to start of the inertia phase. The shift response time REi of the virtual gear position may be a constant value, but may be determined for each type of shift. Also, the delay time DEL may be determined not only based on the type of shift, but also depending on whether the drive system 10 is in a driving mode or a driven mode, or whether the mechanical stepwise variable transmission 20 is manually shifted or automatically shifted. Further, the delay time DEL may be determined in various manners; for example, it may be determined in view of the hydraulic oil temperature of the hydraulic control circuit 42. The delay time DEL may also be determined with even higher accuracy, in view of the MG2 rotational speed Nm as the rotational speed of the intermediate transmission member 18, the engine speed Ne, etc. The delay time DEL thus determined is stored in the data storage unit 90. When the shift response time REi of the virtual gear position is short, the inertia phase may be determined from change of the MG2 rotational speed Nm as the input-side rotational speed of the mechanical stepwise variable transmission 20.

If the elapsed time from the output of the shift command on the mechanical gear position reaches the delay time DEL, and an affirmative decision (YES) is obtained in step R1, step R2 is executed. In other words, if the delay of the output of the shift command on the virtual gear position is terminated, step R2 is executed. In step R2, the electronic control unit 60 determines whether the mechanical gear position is scheduled to be shifted or changed, namely, whether a further shift determination on the mechanical gear position has been made according to the mechanical gear position shift map, during delaying of the output of the command for shift to the initial target virtual gear position Gi1. If the mechanical gear position is scheduled to be shifted, step R3 and subsequent steps are executed. If the mechanical gear position is not scheduled to be shifted, step R6 is executed. In step R6, the electronic control unit 60 determines the latest target virtual gear position Gi2 according to the virtual gear position shift map, and outputs a shift command for shifting the electric continuously variable transmission 16 to the latest target virtual gear position Gi2. Then, the shift control of the virtual gear position is performed according the shift command. If completion of the shift is determined in step R7, the synchronous shift control is completed. Whether the shift of the virtual gear position is completed can be determined by determining whether the engine speed Ne as the input-side rotational speed has reached the synchronous rotation speed ($\gamma 0 \times$Nout) set according to the speed ratio $\gamma 0$ of the post-shift virtual gear position (the latest target virtual gear position Gi2) and the output rotational speed Nout, for example.

Figure 10:
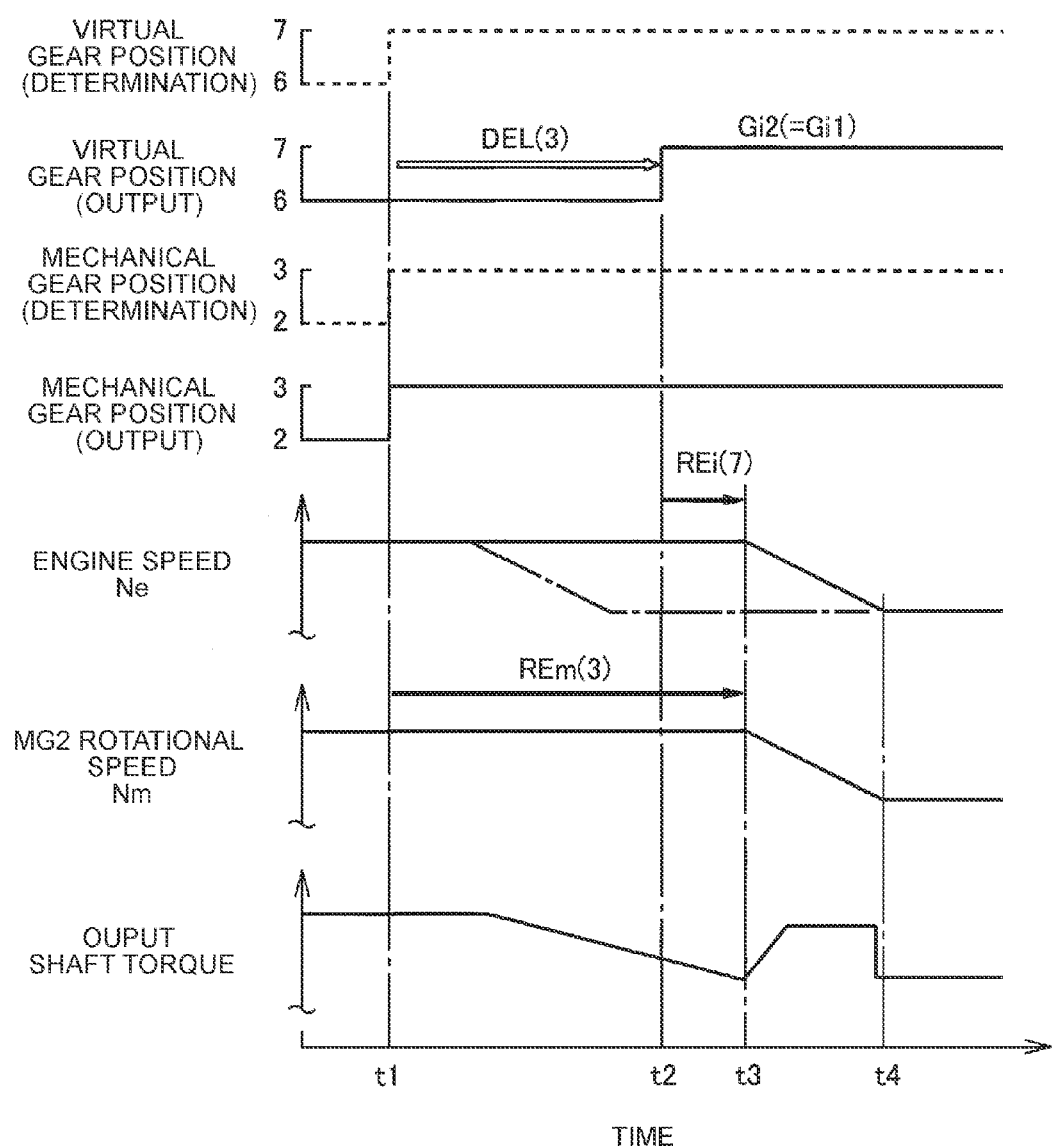
FIG. 10 is one example of a time chart showing change of an operating state of each part when a 2→3 upshift of the mechanical gear position and a 6→7 upshift of the virtual gear position are performed according to the flowcharts of FIG. 8 and FIG. 9.
Figure 11:
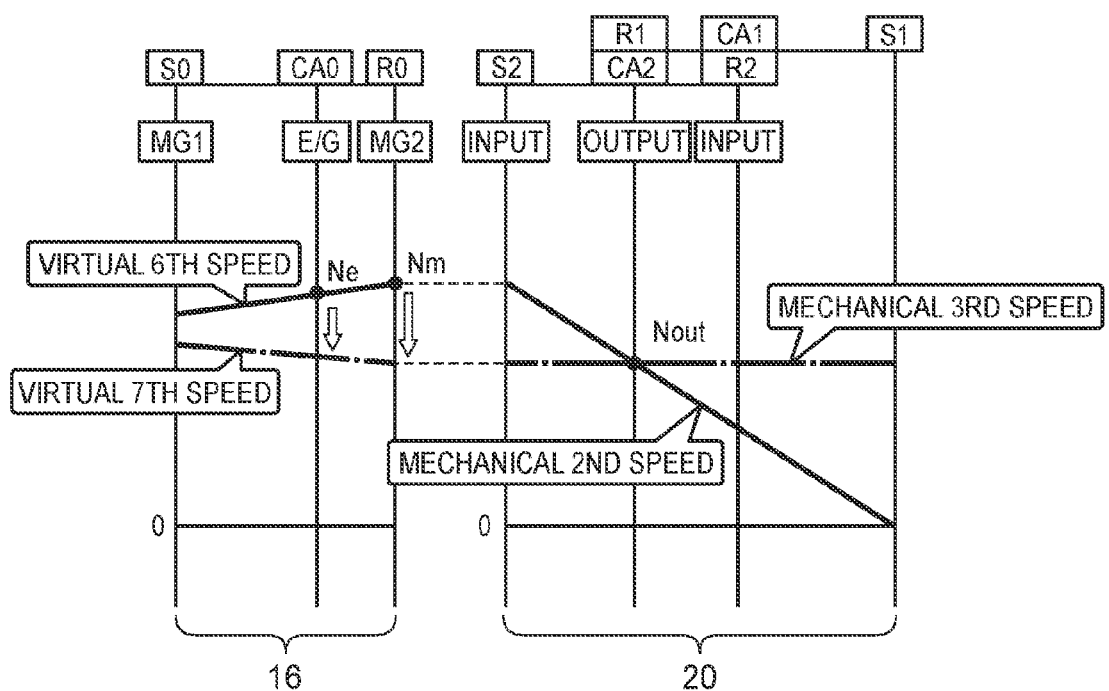
FIG. 11 is a view illustrating changes of operating states of the electric continuously variable transmission and the mechanical stepwise variable transmission on simultaneous shifts of FIG. 10, on a nomographic chart.

FIG. 10 is one example of a time chart showing change of an operating state of each part when the synchronous shift control is performed by the synchronous shift controller 86. The time chart of FIG. 10 shows the case where a 6→7 upshift of the virtual gear position and a 2→3 upshift of the mechanical gear position are performed at the same time. Namely, it is the case where, during traveling of the vehicle in which the mechanical 2nd-speed hear position and the virtual 6th-speed gear position are established, the operating point changes from point P1 shown in FIG. 4, to point P2, over an upshift as the vehicle speed V increases. On a nomographic chart of FIG. 11, a solid line indicates a condition where the mechanical 2nd-speed gear position and the virtual 6th-speed gear position are established, and a one-dot chain line indicates a condition where the mechanical 3rd-speed gear position and the virtual 7th-speed gear position are established after the upshift. In FIG. 11, the MG2 rotational speed Nm as the rotational speed of the intermediate transmission member 18 and the engine speed Ne are reduced as respectively indicated by white arrows.

At time t1 in FIG. 10, a 6→7 upshift determination on the virtual gear position and a 2→3 upshift determination on the mechanical gear position are made, and a shift command of the 2→3 upshift of the mechanical gear position is immediately generated by the mechanical shift controller 80, so that hydraulic control for the shift is started. More specifically, a clutch-to-clutch shift in which the first brake B1 is released and the second clutch C2 is engaged is carried out, and the output shaft torque (torque of the output shaft 22) changes according to the hydraulic control. For shift control of the virtual gear position, the above indicated step R1 is executed, so that a command for shift to the virtual 7th-speed gear position as the latest target virtual gear position Gi2 is generated in step R6, when time t2 is reached after the delay time DEL(3) elapses from the output of the shift command of the mechanical gear position. Namely, the time chart of FIG. 10 shows the case where both of the initial target virtual gear position Gi1 and the latest target virtual gear position Gi2 are the virtual 7th-speed gear position, and the target virtual gear position does not change during delaying of the shift command output. With the output of the shift command of the virtual gear position thus delayed by the delay time DEL(3), the inertia phase (a time period in which the engine speed Ne changes) due to the shift of the virtual gear position, and the inertia phase (a time period in which the MG2 rotational speed Nm changes) due to the shift of the mechanical gear position are started at substantially the same time at time t3. REm(3) denotes the shift response time at the time of an upshift from the mechanical 2nd-speed gear position to the mechanical 3rd-speed gear position, and REi(7) denotes the shift response time at the time of an upshift from the virtual 6th-speed gear position to the virtual 7th-speed gear position. The delay time DEL(3) is determined based on the response time REm(3) and the response time REi(7). At time t4, the engine speed Ne reaches a synchronous rotational speed of the post-shift virtual gear position (virtual 7th-speed gear position), and the shift of the virtual gear position is completed, while the MG-2 rotational speed Nm reaches a synchronous rotational speed of the post-Shift mechanical gear position (mechanical 3rd-speed gear position), and the shift of the mechanical gear position is completed. In the case of FIG. 10, these shifts of the virtual and mechanical gear positions are completed at substantially the same time. While the start time (t3) and ending time (t4) of the inertia phase of the shift of the virtual gear position are substantially the same as those of the shift of the mechanical gear position, it suffices that at least a part of the inertial phase of the shift of the virtual gear position overlaps that of the shift of the mechanical gear position, and the start time and the ending time may be different between the shift of the virtual gear position and the shift of the mechanical gear position.

Thus, at the time of simultaneous shifts when the shift control of the virtual gear position overlaps the shift control of the mechanical gear position, the output of the shift command on the virtual gear position is delayed so that the shifts of both of the virtual gear position and the mechanical gear position are performed in synchronization, irrespective of a difference between the shift response times REi, REm. Therefore, the driver is less likely or unlikely to feel strange or uncomfortable due to shift shock, or the like. In FIG. 10, a one-dot chain line indicated in the section of the engine speed Ne indicates the case where the delaying routine (synchronous shift control) for delaying the output of the shift command on the virtual gear position is not performed. In this case, the inertia phase in which the engine speed Ne changes according to the shift of the virtual gear position appears earlier. Therefore, the inertia phase on the shift of the virtual gear position deviates or shifts in time from the inertia phase (a time period in which the MG2 rotational speed changes) on the shift of the mechanical gear position, and change of the engine speed Ne and change of the output shaft torque occur at different times. As a result, change of engine sound does not coincide with torque variation, and the driver may feel strange or uncomfortable.

Figure 12:
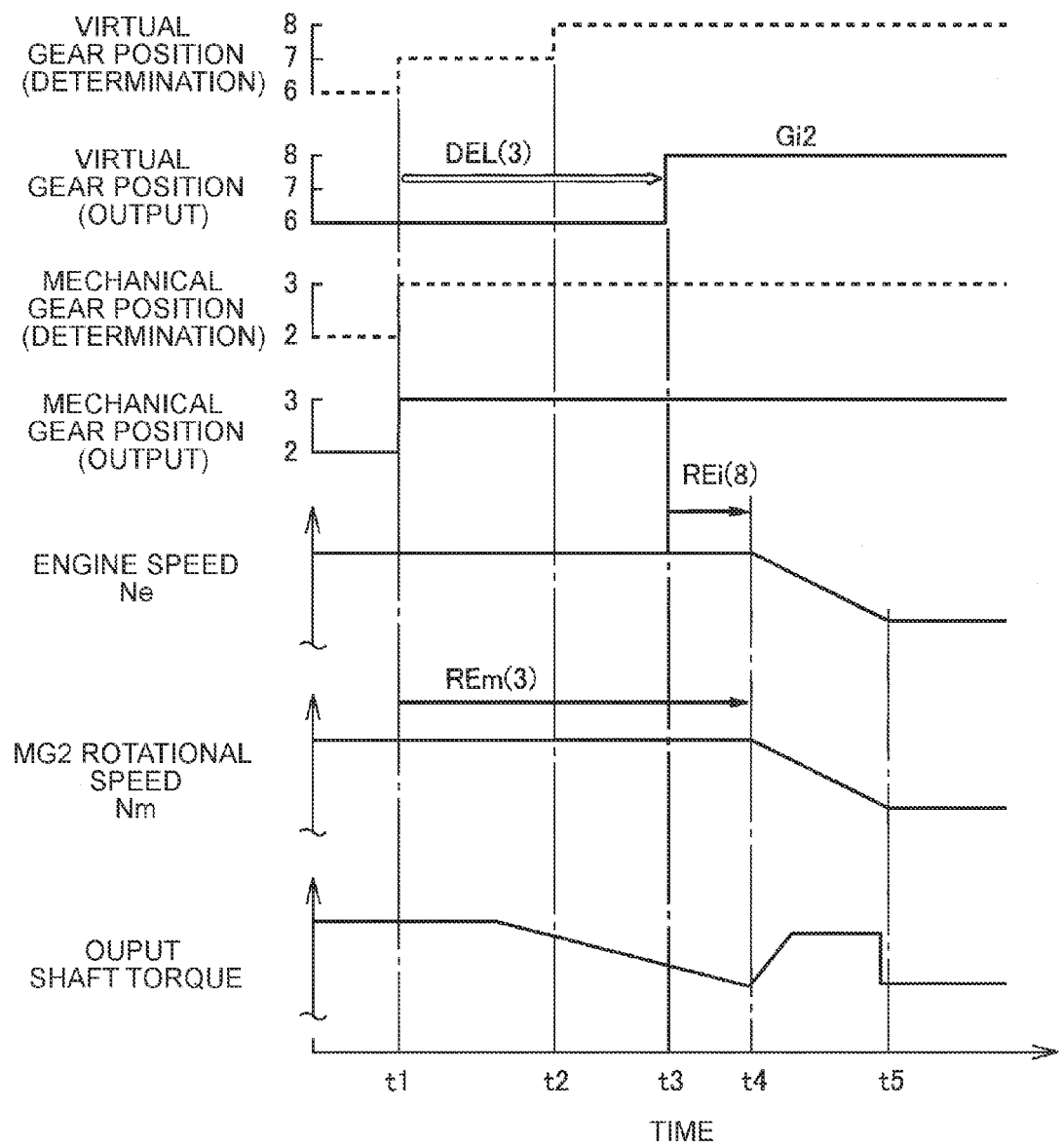
FIG. 12 is one example of a time chart showing change of an operating state of each part when a 2→3 upshift of the mechanical gear position and a 6→8 upshift of the virtual gear position are performed according to the flowcharts of FIG. 8 and FIG. 9.

FIG. 12 is a time chart showing the case where a 6→7 upshift determination on the virtual gear position and a 2→3 upshift determination on the mechanical gear position are made at the same time, as in the case of FIG. 10. In the case of FIG. 12, however, the target gear position to which the electric continuously variable transmission 16 is to be shifted according to the virtual gear position shift map is changed to the virtual 8th-speed gear position at time t2, during delaying of the output of the command for shift to the initial target virtual gear position Gi1, and the latest target virtual gear position Gi2 of step R6 becomes the virtual 8th-speed gear position. In this case, the electric continuously variable transmission 16 skips the virtual 7th-speed gear position, and is immediately shifted to the virtual 8th-speed gear position. Namely, at the time when the delaying operation is terminated, the electric continuously variable transmission 16 is shifted straight to the optimum virtual gear position obtained according to the virtual gear position shift map; therefore, excellent driveability performance can be obtained. Although the shift response time REi(8) associated with the virtual 8th-speed gear position may be different from the shift response time REi(7) associated with the virtual 7th-speed gear position, the difference is a slight difference in view of the control accuracy, and the inertial phases of the shifts of both the virtual gear position and the mechanical gear position are started at substantially the same time, as in the case of FIG. 10. In FIG. 12, times t1, t3, t4, t5 correspond to times t1, t2, t3, t4 in FIG. 10, respectively.

Referring back to FIG. 9, when an affirmative decision (YES) is obtained in the above step R2, namely, when the mechanical gear position is scheduled to be shifted, step R3 is executed. In step R3, the initial target virtual gear position Gi1 stored in step S3 is read, and a command for shift to the initial target virtual gear position Gi1 is generated. Then, if the engine speed Ne is reduced down to the synchronous rotational speed of the post-shift virtual gear position (the initial target virtual gear position Gi1) through torque control of the first motor-generator MG1, an affirmative decision (YES) is obtained in step R4 in which completion of the shift is determined, and step R5 is executed. In step R5, the initial target virtual gear position Gi1 is changed to a virtual gear position corresponding to the type of the next shift of the mechanical gear position. For example, in the case where the next shift of the mechanical gear position is a 2→3 upshift, the virtual 7th-speed gear position to be established by a simultaneous shift (6→7 upshift of the virtual gear position) is set as the initial target virtual gear position Gi1. In the case where the next shift of the mechanical gear position is a 3→4 upshift, the virtual 10th-speed gear position to be established by a simultaneous shift (9→10 upshift of the virtual gear position) is set as the initial target virtual gear position Gi1. Then, after the initial target virtual gear position Gi1 is changed in this manner, step R1 and subsequent steps are executed again. In the above step R5, the latest target virtual gear position at the time of completion of shift may be determined according to the virtual gear position shift map, and the initial target virtual gear position Gi1 may be changed to the latest target virtual gear position. In this case, the highest-speed virtual gear position, out of the virtual gear positions assigned to the post-shift mechanical gear position, may be set as the upper limit, according to the type of the next shift of the mechanical gear position, and an upper-limit guard for limiting the virtual gear position to the highest-speed virtual gear position or a lower-speed position may be provided.

Figure 13:
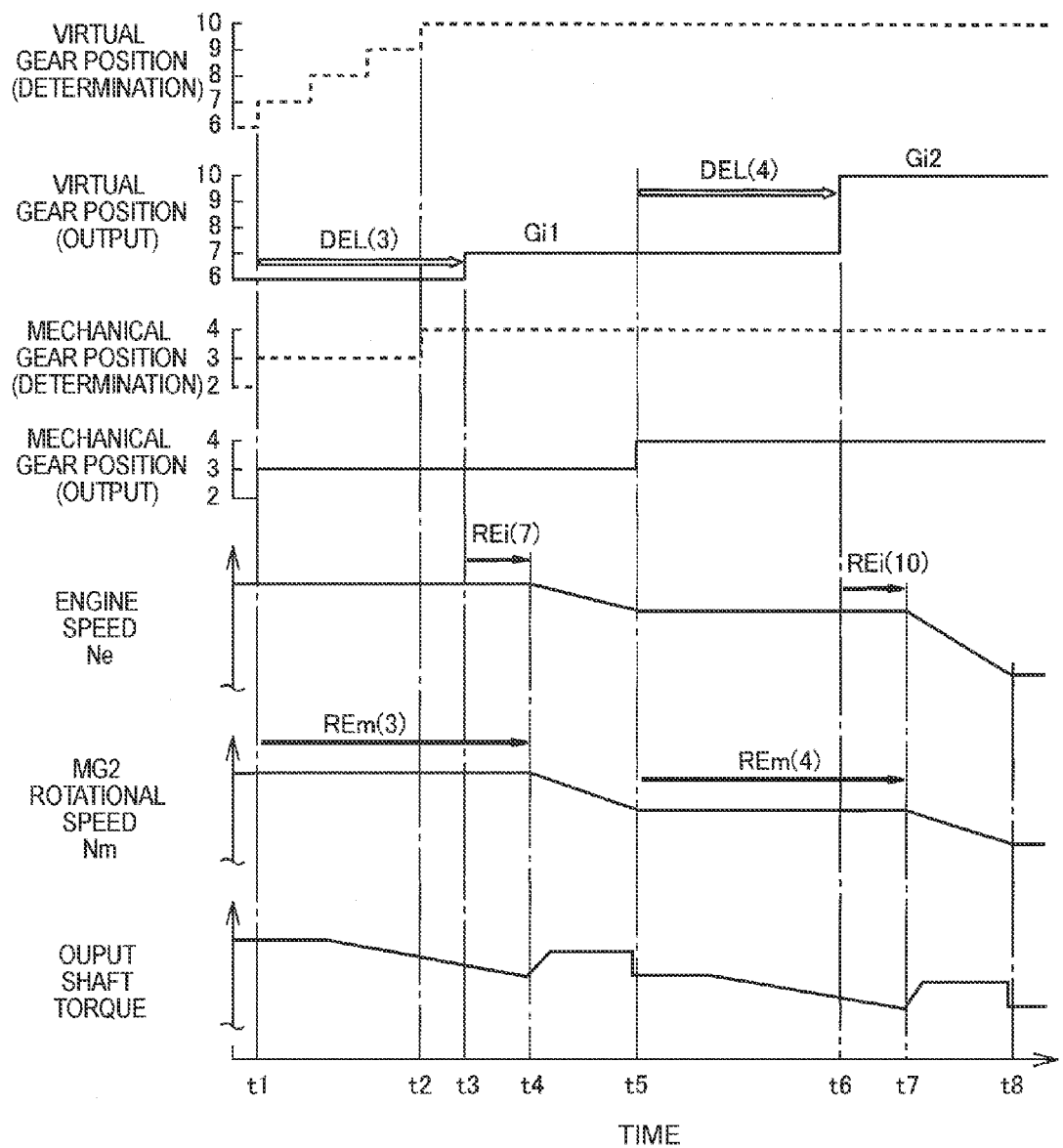
FIG. 13 is one example of a time chart showing change of an operating state of each part when 2→3→4 upshifts of the mechanical gear position and 6→7→10 upshift of the virtual gear position are performed according to the flowcharts of FIG. 8 and FIG. 9.

FIG. 13 is a time chart showing the case where a 6→7 upshift determination on the virtual gear position and a 2→3 upshift determination on the mechanical gear position are made at the same time, as in the case of FIG. 10. In the case of FIG. 13, a shift determination on the mechanical gear position is further made during delaying of the output of a command for shift to the initial target virtual gear position Gi1, and an affirmative decision (YES) is obtained in step R2. Namely, a 3→4 upshift of the mechanical gear position is determined at time t2 during a period of delay time DEL(3), and the target gear position determined according to the virtual gear position shift map changes to the virtual 10th-speed gear position. In this case, at time t3 when the delay time DEL(3) elapses, step R3 is executed so that a command for shift to the initial target virtual gear position Gi1 (virtual 7th-speed gear position) is generated. As a result, in a period between time t4 and time t5, the 6→7 upshift of the virtual gear position and the 2→3 upshift of the mechanical gear position are performed in synchronization. If the 2→3 upshift of the mechanical gear position is completed at time t5, the mechanical shift controller 80 immediately outputs a shift command for the 3→4 upshift of the mechanical gear position, to start shift control, and step R1 is executed, so that the output of a command for shift to the virtual 10th-speed gear position is delayed by a predetermined delay time DEL(4). The delay time DEL(4) is determined by subtracting the shift response time REi(10) of the upshift to the virtual 10th-speed gear position from the shift response time REm(4) of the 3→4 upshift of the mechanical gear position. Then, at time t6 when the delay time DEL(3) elapses, step R6 is executed so that a shift command for an upshift to the latest target virtual gear position Gi2 (virtual 10th-speed gear position) is generated. Then, in a period between time t7 and time t8, a 7→10 upshift of the virtual gear position and the 3→4 upshift of the mechanical gear position are performed in synchronization. The shift control of these upshifts is carried out, for example, when the accelerator operation amount Acc changes from point P1 to point P3 due to the driver's operation to return the accelerator pedal, during traveling in the mechanical 2nd-speed gear position and the virtual 6th-speed gear position, as shown in FIG. 4. In the case where sequential shifting can be performed, namely, where the gear position can be shifted up or down by the driver's manual operation using the shift lever 48, up-down switch, or the like, for example, when a shift request for an upshift is repeatedly made by manual operation, shift control similar to the above control is performed.

In this case, when the delay of output of the shift command for the initial virtual gear position is terminated, the shift command for establishing the initial target virtual gear position Gi1, rather than the latest target virtual gear position Gi2 determined when the delay of output of the shift command is terminated, is generated. Then, the electric continuously variable transmission 16 is shifted to the initial target virtual gear position Gi1. Therefore, mismatch between the mechanical gear position and the virtual gear position, which are simultaneously shifted in a period between time t4 and time t5, is prevented. Thus, the simultaneous shifts of these gear positions are further appropriately performed, and the next simultaneous shifts of the mechanical gear position and the virtual gear position are appropriately performed.

Thus, in the vehicular drive system 10 of this embodiment, a plurality of virtual gear positions having different speed ratios γ0 of the engine speed Ne to the output rotational speed Nout of the mechanical stepwise variable transmission 20 are established by the electric continuously variable transmission 16. Therefore, the engine speed Ne is changed in a stepwise fashion on shifts of the virtual gear position, and shift feeling similar to that of the mechanical stepwise variable transmission is obtained.

Also, when the shift control of the virtual gear position overlaps the shift control of the mechanical gear position, more specifically, when simultaneous shifts are determined according to the common shift map, the output of the shift command on the virtual gear position is delayed so that the shifts of the virtual gear position and the mechanical gear position are performed in synchronization. Therefore, the shifts of the virtual gear position and the mechanical gear position are performed in synchronization, irrespective of a difference between the shift response time REi and the shift response time REm, and the driver is less likely or unlikely to feel strange or uncomfortable due to shift shock, for example. Namely, the shift response time REi of the electric continuously variable transmission 16 that is shifted up or down through torque control of the first motor-generator MG1 is shorter than the shift response time REm of the mechanical stepwise variable transmission 20 that is shifted up or down through hydraulic control. Therefore, if the shift commands are simultaneously generated to the electric continuously variable transmission 16 and the mechanical stepwise variable transmission 20, change of the engine speed Ne (inertia phase) caused by the shift of the electric continuously variable transmission 16 takes place earlier than change of the output shaft torque due to change of the MG2 rotational speed Nm (inertia phase) caused by the shift of the mechanical stepwise variable transmission 20, and the driver may feel strange or uncomfortable.

Also, when the shift of the virtual gear position and the shift of the mechanical gear position are performed in synchronization, as described above, the mechanical stepwise variable transmission 20 is shifted up or down, along with change of the engine speed Ne. Therefore, even if shift shock occurs on the shift of the mechanical stepwise variable transmission 20, the driver is less likely or unlikely to feel strange or uncomfortable.

Figure 9:
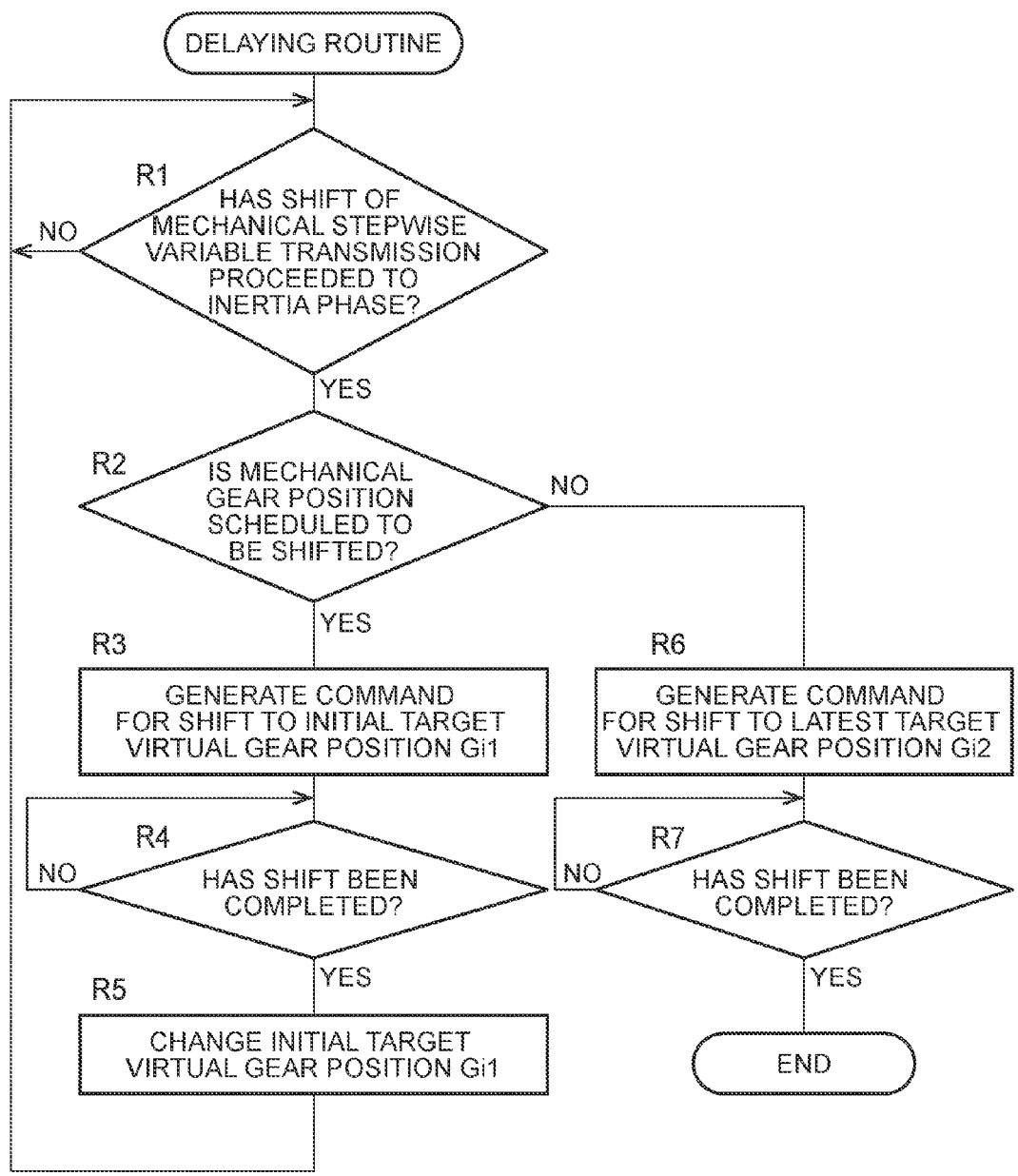
FIG. 9 is a flowchart useful for specifically explaining the content of a routine of step S4 in FIG. 8.

Also, if a further shift determination on the mechanical gear position is made during delaying of output of the shift command, namely, if an affirmative decision (YES) is made in step R2 of FIG. 9, step R3 is executed to output a shift command for establish the initial target virtual gear position Gi1. Therefore, mismatch between the mechanical gear position and the virtual gear position that are simultaneously shifted is prevented, and simultaneous shifts of the mechanical gear position and the virtual gear position, which are to be performed next, will be appropriately performed. On the other hand, if a further shift determination on the mechanical gear position is not made during delaying of output of the shift command, namely, if a negative decision (NO) is made in step R2 of FIG. 9, step R6 is executed to generate a shift command for establishing the latest target virtual gear position Gi2 determined at the time when the delay is terminated. Therefore, the electric continuously variable transmission 16 is shifted straight to the optimum virtual gear position obtained according to the virtual gear position shift map, and excellent driveability performance can be obtained.

While some embodiments have been described in detail with reference to the drawings, these are mere examples of implementation, and this disclosure may be embodied with various changes or improvements, based on the knowledge of those skilled in the art.

What is claimed is:
1. A hybrid vehicle comprising:
 a drive source;
 an electric continuously variable transmission configured to steplessly change a rotational speed of the drive source by torque control of a differential rotating machine, and transmit a changed rotational speed of the drive source to an intermediate transmission member;
 a mechanical stepwise variable transmission disposed between the intermediate transmission member and drive wheels, the mechanical stepwise variable transmission being configured to establish a plurality of mechanical gear positions, the plurality of the mechanical gear positions being gear positions that have different speed ratios of a rotational speed of the intermediate transmission member to an output rotational speed of the mechanical stepwise variable transmission, the mechanical gear positions being mechanically established by the mechanical stepwise variable transmission; and an electronic control unit configured to control the electric continuously variable transmission so as to establish a plurality of virtual gear positions, the plurality of the virtual gear positions being gear positions that have different speed ratios of the rotational speed of the drive source to the output rotational speed of the mechanical stepwise variable transmission, the electronic control unit being configured to delay output of a shift command on the virtual gear position, with respect to output of a shift command on the mechanical gear position, such that a shift of the virtual gear position and a shift of the mechanical gear position are performed in synchronization, irrespective of a difference in a shift response time, on simultaneous shifts in which shift control of the virtual gear position overlaps shift control of the mechanical gear position.

2. The hybrid vehicle according to claim 1, wherein the electronic control unit is configured to:

store a target virtual gear position determined when the output of the shift command on the virtual gear position is delayed, as an initial target virtual gear position;

when a further shift determination on the mechanical gear position is made during delay of the output of the shift command, generate a shift command for establishing the initial target virtual gear position when the delay is terminated, when no further shift determination on the mechanical gear position is made during delay of the output of the shift command, determine a latest target virtual gear position at the time when the delay is terminated, and generate a shift command for establishing the latest target virtual gear position.

3. A control method for a hybrid vehicle, the hybrid vehicle including a drive source, an electric continuously variable transmission configured to steplessly change a rotational speed of the drive source by torque control of a differential rotating machine, and transmit a changed rotational speed of the drive source to an intermediate transmission member, a mechanical stepwise variable transmission disposed between the intermediate transmission member and drive wheels, the mechanical stepwise variable transmission being configured to establish a plurality of mechanical gear positions, the plurality of the mechanical gear positions being gear positions that have different speed ratios of a rotational speed of the intermediate transmission member to an output rotational speed of the mechanical stepwise variable transmission, the mechanical gear positions being mechanically established by the mechanical stepwise variable transmission, and an electronic control unit, the control method comprising:

controlling, by the electronic control unit, the electric continuously variable transmission so as to establish a plurality of virtual gear positions, the plurality of the mechanical gear positions being gear positions that have different speed ratios of the rotational speed of the drive source to the output rotational speed of the mechanical stepwise variable transmission; and delaying, by the electronic control unit, output of a shift command on the virtual gear position, with respect to output of a shift command on the mechanical gear position, such that a shift of the virtual gear position and a shift of the mechanical gear position are performed in synchronization, irrespective of a difference in a shift response time, on simultaneous shifts in which shift control of the virtual gear position overlaps shift control of the mechanical gear position.

* * * * *